(12) United States Patent
Dobbin et al.

(10) Patent No.: US 11,118,618 B2
(45) Date of Patent: Sep. 14, 2021

(54) CAP WITH SEALANT FLOW PATH

(71) Applicant: AIRBUS OPERATIONS LIMITED, Bristol (GB)

(72) Inventors: Richard Dobbin, Bristol (GB); Julien Legrand, Bristol (GB); Julien Assemat, Bristol (GB); Thomas Monaghan, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 247 days.

(21) Appl. No.: 16/366,236

(22) Filed: Mar. 27, 2019

(65) Prior Publication Data

US 2019/0301515 A1 Oct. 3, 2019

(30) Foreign Application Priority Data

Mar. 28, 2018 (GB) ...................................... 1804984

(51) Int. Cl.
*F16B 33/00* (2006.01)
*F16B 37/14* (2006.01)
*B64D 45/02* (2006.01)

(52) U.S. Cl.
CPC ............ *F16B 33/004* (2013.01); *F16B 37/14* (2013.01); *B64D 45/02* (2013.01); *F16B 33/00* (2013.01)

(58) Field of Classification Search
CPC ...... F16B 33/004; F16B 37/14; F16B 41/005; F16B 33/00; Y10S 411/91; B64D 45/02
USPC ............................ 411/372.5, 372.6, 373, 377
See application file for complete search history.

(56) References Cited

U.S. PATENT DOCUMENTS

| | | | | | |
|---|---|---|---|---|---|
| 3,241,427 | A | * | 3/1966 | Bosler ..................... | F16B 37/14 411/368 |
| 3,548,704 | A | * | 12/1970 | Kutryk ..................... | F16B 39/08 411/373 |
| 4,400,123 | A | * | 8/1983 | Dunegan .................. | F16B 37/14 116/270 |
| 4,659,273 | A | * | 4/1987 | Dudley .................. | F16B 41/005 411/373 |

(Continued)

FOREIGN PATENT DOCUMENTS

| | | |
|---|---|---|
| AU | 534714 | 2/1984 |
| DE | 101 48 414 | 3/2003 |

(Continued)

OTHER PUBLICATIONS

Search Report for GB1804984.1 dated May 14, 2018, 6 pages.

(Continued)

*Primary Examiner* — Roberta S Delisle
(74) *Attorney, Agent, or Firm* — Nixon & Vanderhye P.C.

(57) ABSTRACT

A cap for forming a sealed cavity around an end of a fastener protruding from a surface of a structure is disclosed. The disclosure relates to a spark prevention cap. The cap has an annular base with an annular base terminating at a base rim. The base rim surrounds an opening into a central cavity for receiving the end of the fastener. The base rim lies in a base rim plane around at least a majority of a circumference of the annular base. An annular skirt provides an annular pocket in which a sealant material is received. A biasing configuration is configured to positively bias the base rim against the surface of the structure.

18 Claims, 5 Drawing Sheets

(56) References Cited

U.S. PATENT DOCUMENTS

| | | | | |
|---|---|---|---|---|
| 5,082,409 A * | 1/1992 | Bias | ............... | F16B 37/14 |
| | | | | 411/372.5 |
| 6,086,972 A * | 7/2000 | Rayburn | ............... | B25B 23/00 |
| | | | | 411/373 |
| 6,238,158 B1 * | 5/2001 | Clements | ............... | F16B 37/14 |
| | | | | 411/372.6 |
| 8,894,338 B2 * | 11/2014 | Dobbin | ............... | F16B 39/225 |
| | | | | 411/373 |
| 9,228,604 B2 * | 1/2016 | Dobbin | ............... | B64C 1/12 |
| 9,416,811 B2 * | 8/2016 | Dobbin | ............... | B64D 45/02 |
| 9,506,493 B2 * | 11/2016 | Dobbin | ............... | B64C 1/12 |
| 9,599,141 B2 * | 3/2017 | Dobbin | ............... | F16B 37/14 |
| 10,240,628 B2 * | 3/2019 | Dobbin | ............... | F16B 37/14 |
| 10,774,869 B2 * | 9/2020 | Dobbin | ............... | B64D 45/02 |
| 2015/0300397 A1 * | 10/2015 | Dobbin | ............... | B64D 45/02 |
| | | | | 411/372.6 |
| 2016/0169266 A1 | 6/2016 | Dobbin et al. | | |
| 2017/0009797 A1 | 1/2017 | Rawdon et al. | | |

FOREIGN PATENT DOCUMENTS

| | | |
|---|---|---|
| EP | 0 334 011 | 9/1989 |
| EP | 2 698 318 | 2/2014 |
| GB | 1157527 | 7/1969 |
| GB | 2514171 | 11/2014 |
| GB | 2523123 | 8/2015 |
| GB | 2523125 | 8/2015 |
| GB | 2535518 | 8/2016 |
| JP | 64-3308 | 1/1989 |
| JP | 3021104 | 11/1995 |
| WO | 2012/107741 | 8/2012 |
| WO | 2013/178985 | 12/2013 |
| WO | 2014/072687 | 5/2014 |
| WO | 2014/118117 | 8/2014 |
| WO | 2015/025130 | 2/2015 |
| WO | 2015/121624 | 8/2015 |

OTHER PUBLICATIONS

Search Report for GB1804984.1 dated Oct. 10, 2018, 2 pages.
Partial European Search Report for European Application No. 19163229.8, 12 pages, dated Aug. 9, 2019.

* cited by examiner

CAP WITH SEALANT FLOW PATH

CROSS RELATED APPLICATION

This application claims priority to United Kingdom (GB) patent application 1804984.1, filed Mar. 28, 2018, the entire contents of which are hereby incorporated by reference.

FIELD OF THE INVENTION

The present invention relates to a cap for forming a sealed cavity around an end of a fastener. In particular, but not exclusively, the present invention relates to a spark containment cap. The present invention also relates to a joint, a method of assembling a joint, and an aircraft comprising at least one of the cap and the joint.

BACKGROUND OF THE INVENTION

Large passenger aircraft are typically struck by lightning once or twice a year, each lightning bolt striking with up to 200,000 amps of electrical current that seeks the path of least electrical resistance. Many modern passenger aircraft have exterior surfaces made from composite materials which have a very high electrical resistance. There is therefore a high probability of lightening attachment at any of the many metallic fasteners in the exterior surface, which have a much lower electrical resistance. In the wing, some of these fasteners pass through the outer wing skin into the fuel tank.

FIG. 1 is a side view of part of a fastener assembly passing through a panel 1, which may be a composite or metallic panel. The assembly comprises a fastener comprising an externally threaded bolt 2, an internally threaded nut 3, and a washer 4. In the event of a lightning strike hitting the panel 1 and attaching to the fastener, sparking, plasma or outgassing may occur at the locations indicated by reference 5 in FIG. 1.

It is known to provide injectable nut caps, for example WO 2015/025130, which are provided over the end of the fastener protruding from the panel. Such a nut cap is provided to form a sealed cavity around an end of a fastener. An inner cap body is provided that terminates at an inner cap rim which surrounds an opening into a central cavity. An annular skirt terminating at a skirt rim provides an annular pocket between the skirt and the inner cap body, in which a curable sealing material is provided. However, uncured sealing material may flow from the pocket.

SUMMARY OF THE INVENTION

According to an aspect of the invention, there is provided a cap for forming a sealed cavity around an end of a fastener protruding from a surface of a structure, the cap comprising: a cap body with an annular base terminating at a base rim which surrounds an opening into a central cavity for receiving the end of the fastener and lies in a base rim plane around at least a majority of a circumference of the annular base; an annular skirt providing an annular pocket for receiving a sealant material between the skirt and the annular base, and a biasing configuration configured to positively bias the base rim against the surface of the structure.

With this arrangement, the base rim is urged into a close engagement with the surface of the structure from which the end of the fastener extends. As such, leakage of air and sealant into the central cavity can be minimised.

The annular base may comprise a cap axis, the biasing configuration being displaceable radially away from the cap axis and being biased radially towards the cap axis upon displacement.

As such, it is possible to provide a biasing force to aid positive engagement of the base rim with the surface prior to a sealant being received by the cap.

At least part of the annular base may be configured to distend radially outwardly.

The annular base may act on the biasing configuration to bias the biasing configuration radially inwardly.

The biasing configuration may comprise at least one protrusion extending inwardly from the base into the central cavity, wherein the at least one protrusion comprises a cam surface arranged to locate against the fastener, the cam surface being inclined to slope towards the base rim plane away from the base to a free end of the at least one protrusion.

With such an arrangement it is possible to use the protrusions to bias the base rim against the surface.

At least one protrusion may comprise at least two, and optionally at least three, opposing protrusions distributed around the cap body.

The at least two opposing protrusions may be distributed around an internal face of the annular base, wherein the annular base may have a lobed shape in cross-section such that a radially outwardly bulging lobe extends between each neighbouring pair of protrusions.

As such, the base of the cap may be used to provide an urging force. The cap may be formed in a simple manner.

The at least one protrusion may comprise a guide element forming the cam surface.

The at least one protrusion may comprise a rib projecting inwardly from the base, and the guide element may project from the rib.

The cam surface may be planar.

The cam surface may be inclined at between 15-60 degrees to the base rim plane.

The at least one protrusion may be in a fixed relationship with the annular base.

The at least one protrusion may be proximate to or at the base rim.

The at least one protrusion may comprise a displacing face configured to abut the fastener when the cap is received over the end of the fastener to urge the at least one protrusion to distend radially outwardly.

According to a further aspect of the invention, there is provided a spark prevention cap for forming a sealed cavity around an end of a fastener, the cap comprising: a cap body with an annular base terminating at a base rim which surrounds an opening into a central cavity for receiving the end of the fastener and lies in a base rim plane around at least a majority of a circumference of the annular base; at least two guide elements distributed around an internal face of the annular base, each guide element extending inwardly into the central cavity from the base; wherein the annular base has a lobed shape in cross-section such that a radially outwardly bulging lobe extends between each neighbouring pair of guide elements.

Each guide element may be a retention tab.

With such a configuration, it is possible to simply provide a biasing force to the guide elements to ensure that the guide elements correctly engage with the fastener and restrict removal of the cap from the end of the fastener.

Each guide element may comprise a cam surface, the cam surface being inclined to slope towards the base rim plane away from the base to a free end of each guide element.

The cap may comprise an annular skirt providing an annular pocket for receiving a sealant material between the skirt and the annular base.

The cap may comprise an inlet hole in the skirt, wherein the inlet hole is in fluid communication with the pocket to permit a flow of sealing material through the skirt via the inlet hole into the pocket; and an outlet in the skirt, wherein the outlet is in fluid communication with the pocket and arranged to enable air to escape the annular pocket through the skirt via the outlet as the sealing material flows from the inlet hole into the pocket.

The base rim may lay in the base rim plane around the full circumference of the skirt.

According to a further aspect of the invention, there is provided a joint comprising: a structure; an end of a fastener protruding from the structure; and a cap as described above forming a sealed cavity around the end of the fastener, the cap comprising a cured sealing material in the annular pocket which secures the cap to the structure.

According to a further aspect of the invention, there is provided a method of assembling the joint as described above, the method comprising: fitting the cap over the end of the fastener; and injecting sealing material into the annular pocket.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
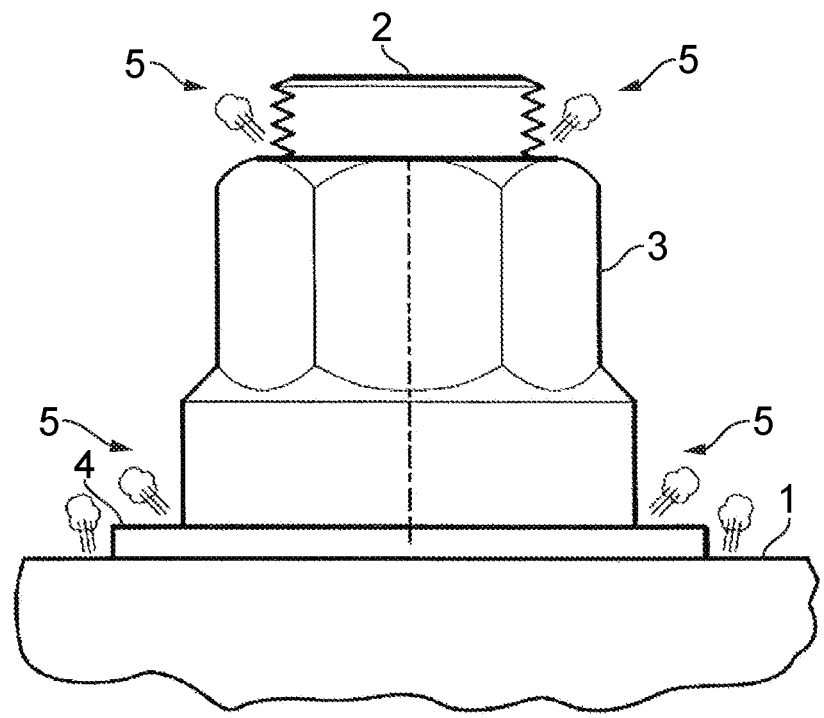
FIG. 1 shows a side view of part of a prior art fastener assembly protruding from a structure.
Figure 2:
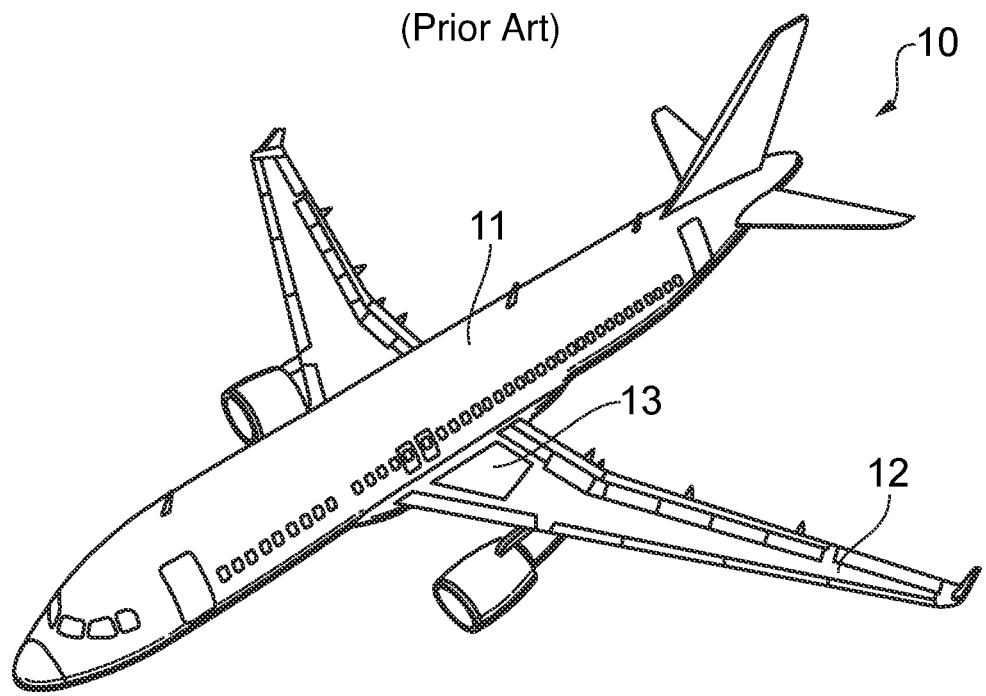
FIG. 2 shows a perspective view of an aircraft.
Figure 3:
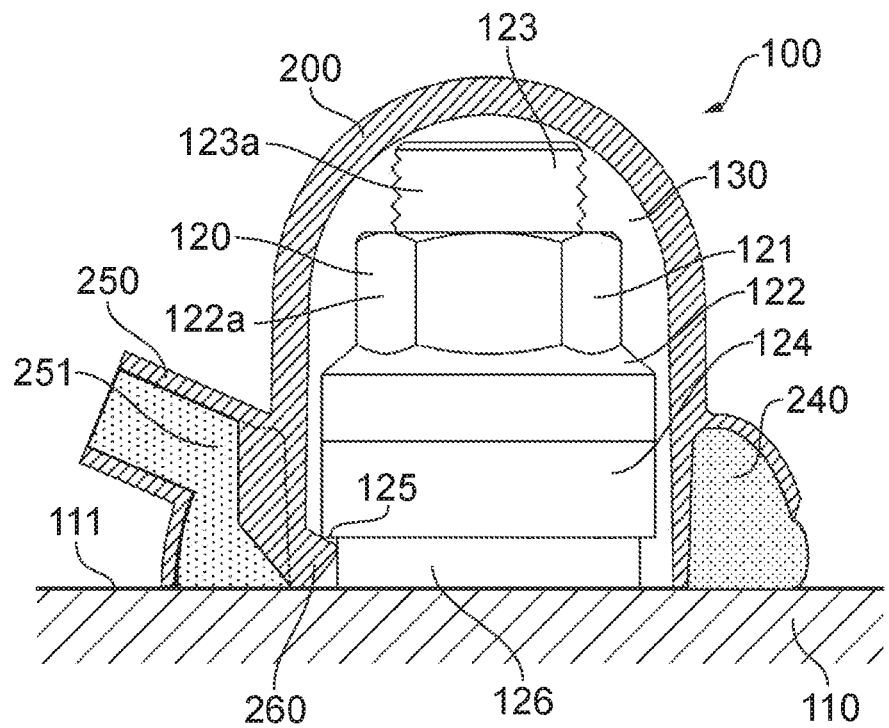
FIG. 3 shows a partial cross-sectional front view of a joint comprising a fastener and a cap following injection with a sealant.

An aircraft 10 is shown in FIG. 2. The aircraft 10 includes a fuselage 11. Two wings 12 extend from the fuselage 11. It will be appreciated that the fuselage 11 and wings 12 may take a variety of different planform shapes and profiles depending on the particular application. Fuel tanks 13 are formed in the fuselage 11 and wings 12. One such fuel tank 13 is shown schematically in FIG. 2. The fuel tanks 13 are formed by a structure or structures forming part of the aircraft 10.

FIGS. 3 to 7 show a joint 100 in stages of installation. The joint 100 is shown assembled in FIG. 3. The joint 100 comprises a structure 110 such as an aircraft skin panel. The structure 110 has a planar surface 111. A fastener 120 extends through the structure 110. The structure 110 in this embodiment is a composite aircraft structural component, but may be a hybrid composite-metallic or other component.

An end 121 of the fastener 120 protrudes from the structure 110. The fastener 120 comprises a first fastening member 122 and a second fastening member 123. The first and second fastening members 122, 123 are engageable with each other.

The second fastening member 123 comprises an axially extending shaft 123a protruding from the structure 110. The first fastening member 122 comprises a nut 122a screwed onto the shaft 123a and a washer 124 between the nut 122a and the structure 110. The nut 122a is threadingly engageable on the shaft 123a. The fastener 120 defines a longitudinal axis.

The washer 124 is stepped. The washer 124 defines a step 125 of the fastener 120. In the Figures the step 125 is formed by a diametrically recessed section 126 in an outer side of the washer 124. The step 125 faces a structure contact face 127 of the washer 124. In an alternative embodiment, the washer 124 comprises first and second washer parts in which the second washer part has a smaller diameter than the first washer part. The step 125 may be formed by a groove in the washer 124 (not shown). In embodiments, the step is defined by the washer having a smaller outer diameter than the nut. In embodiments, the step is formed in the nut.

A cap 200 encloses the end 121 of the fastener 120 and will be described in detail with reference to FIGS. 3 to 10. The cap 200 has a cap body 201 with a domed outboard (upper) part 202 and a substantially cylindrical base 210. The base 210 is annular. The base 210 terminates at a rim 211 which surrounds an opening 212 into a central cavity 130. The rim 211 lies in a plane 214 so it can intimately engage with the planar surface 111 of the structure 110 around its full circumference when the cap 200 is fitted over the end 121 of the fastener 120 as shown.

An annular skirt 220 extends from an outboard (upper) end 221 where it meets the cap body 210 to an inboard (lower) skirt rim 222. The skirt has a flared elliptical outboard (upper) part 223 which extends away from the cap body 210, and a substantially cylindrical inboard (lower) part 224 which extends parallel with a cap axis 230. The skirt rim 222 represents the inboard (lower) extent of the skirt 220.

An annular pocket 240 is provided between the skirt 220 and the annular base 210. The pocket 240 extends from a closed outboard end 241 at the outboard end 221 of the skirt 220, to an open inboard end 242 at the skirt rim 222. Due to the flared shape of the outboard part 223 of the skirt 220, the pocket 240 has a radial width which increases as it extends from its outboard end 241 to its inboard end 242.

The skirt 220 has a tubular projection 250 which projects outwardly from the skirt and provides an injection channel leading to a circular inlet hole 251. The tubular projection 250 is arranged to interconnect with a nozzle of a sealing material injection device (not shown) to provide a flow of sealing material through the skirt 220 via the inlet hole 251 into the pocket 240. In this case they are interconnected by receiving the projection 250 within the sealing material injection device nozzle, although the opposite arrangement is also possible. The skirt 220 also has an outlet 270 on an opposite side of the cap axis 230 to the inlet hole 251. The skirt 220 terminates in the skirt rim 222 which surrounds the pocket 240 and lies in a plane around a majority of its circumference except where it is formed with an outlet recess 271 shown most clearly in FIG. 5. The outlet recess 271 extends around about ⅛th of the circumference of the cap.

The outlet 270 is in fluid communication with the pocket 240 and is arranged to enable air to escape the pocket 240 through the skirt via the outlet 270 as the sealing material flows from the inlet hole 251 into the pocket 240.

The cap body 201 is formed with three protrusions 261. The protrusions 261 project inwardly into the central cavity 130. The protrusions 261 protrude from an inner surface 213 of the base 210. Each protrusion comprises a guide element 260 formed as a tooth. Each protrusion 261 acts as a retention tab. The retention tabs act to retain the cap 200 on the end of the fastener 120. The retention tab acts to guide and retain the cap against the surface 111 of the structure 120. Each guide element 260 projects radially inwardly. The guide elements 260 are formed at the lower, inboard, end of the cap body 201. The guide elements 260 are proximate the base rim 211. In the present embodiment the cap 200 is formed with three guide elements 260, however the number of guide elements may differ. For example, in FIG. 9 an alternative cap 200 is shown with five guide elements 260. The guide elements 260 are dispersed equidistantly around the base 210.

Each guide element 260 is on a rib 215. The ribs 215 extend axially (refer in particular to FIG. 5) and project inwardly into the central cavity 130. The ribs 215 protrude from the inner surface 213 of the base 210. In embodiments, the ribs 215 abut the cylindrical outer faces of the washer 124 as an interference fit, when the fastener 120 is received in the cap 200. The guide elements 260 protrude from the ribs 215. Alternatively, or additionally, one or more of the guide elements 260 protrudes from the inner surface 213 and the ribs 215 are omitted.

Each guide element 260 has a fastener locating face 262. The locating face 262 acts as a cam surface. The locating face 262 is configured to abut against the step 125. The locating face 262 is inclined to slope towards the base rim plane 214. The locating face 262 extends in an inboard direction from the base 210 to a free end 263 of the guide element 260. The cam surface is inclined at between 15-60 degrees to the base rim plane 214.

The locating face 262 of each guide element 260 is angled with respect to the cap axis 230. The locating faces 262 form closed faces, that is they face into the outboard (upper) end of the cavity 130. The locating face 262 of each guide element 260, acting as cam surfaces, are inclined downwardly towards the inboard (lower) end. The locating faces 262 are inclined by the same angle with the base rim plane 214. The locating faces 262 converge inwardly towards the cap axis 230. Each of the locating faces 262 is planar. The locating faces 262 extend from the ribs 215, that is away from the base 210. The locating faces 262 each provide a contact region at which the guide elements 260 can contact the fastener.

The protrusions 261 oppose each other in the cavity 130. That is, at least two protrusions 261 are dispersed at greater than 90 degrees to each other. With three evenly distributed protrusions, the protrusions 261 are disposed at 120 degrees to each other, for example.

Each guide element 260 has an open face 264. The open face 264 faces the base rim plane 214. The open face 264 is exposed to the opening 212 into a central cavity 130. The open face 264 extends from the base rim 211. In embodiments, the open face 264 is set back from the base rim 211. The open face 264 is inclined to slope away from the base rim plane 214. The open face 264 extends in an outboard direction from the cap body to a free end 263 of the guide element 260. The locating face 262 and the open face 264 of each guide element 260 converge towards the open end 263. The guide element 260 has a substantially triangular profile.

The distance between the base rim plane 214 and the locating face 262, that is the lower end of the locating face 262, is smaller than the height of the step 125. The height of the step 125 corresponds to the distance between the step 125 and the structure contact face 127 of the washer 124. The distance between the base rim plane 214 and the upper end of the locating face 262 is greater than the height of the step 125.

Figure 7:
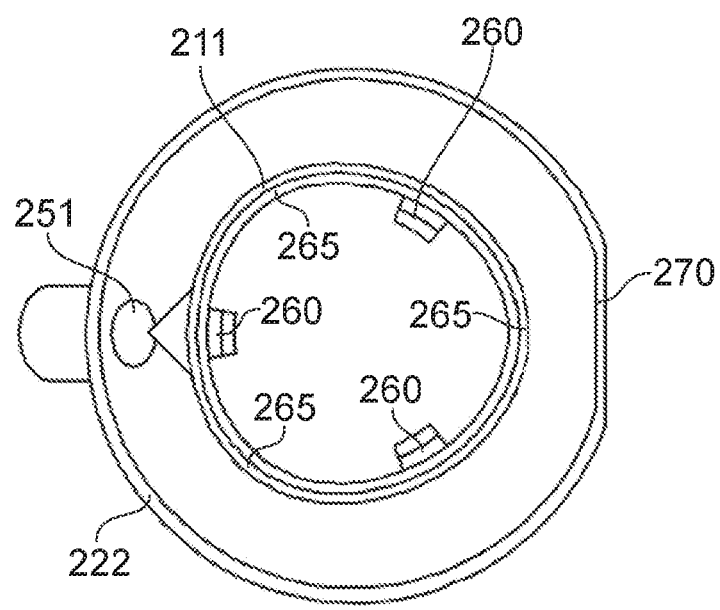
FIG. 7 shows a plan view from below of the cap of FIG. 6.
Figure 8:
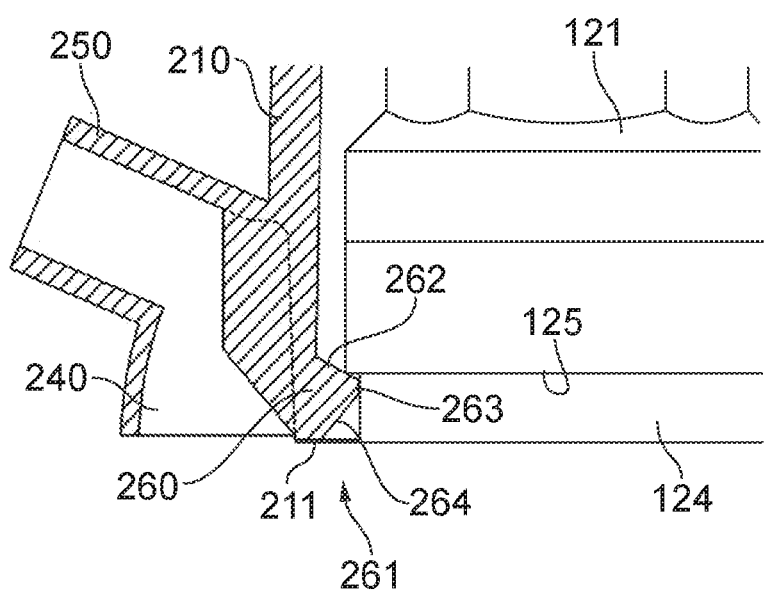
FIG. 8 shows a partial cross-sectional view of part of the joint of FIG. 4.
Figure 9:
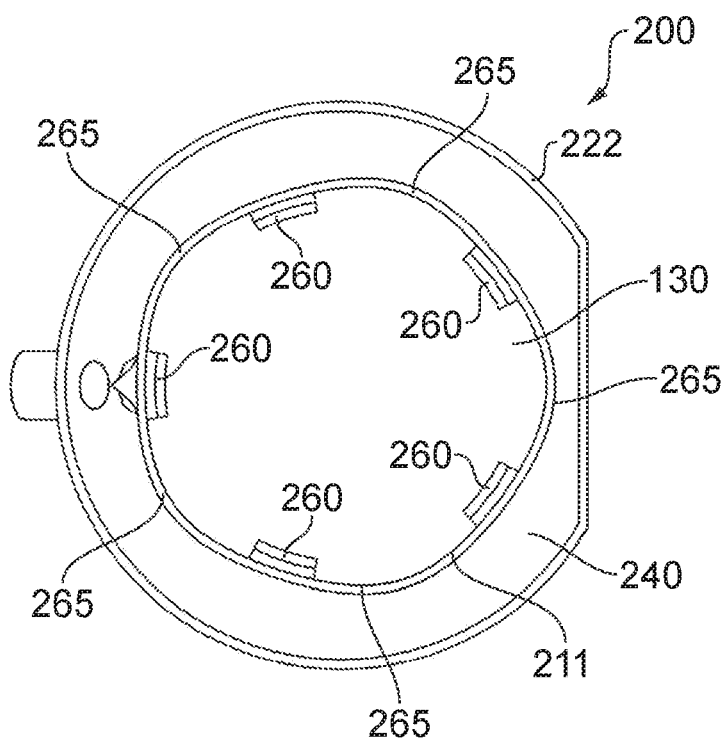
FIG. 9 shows a plan view from below of another cap.
Figure 10:
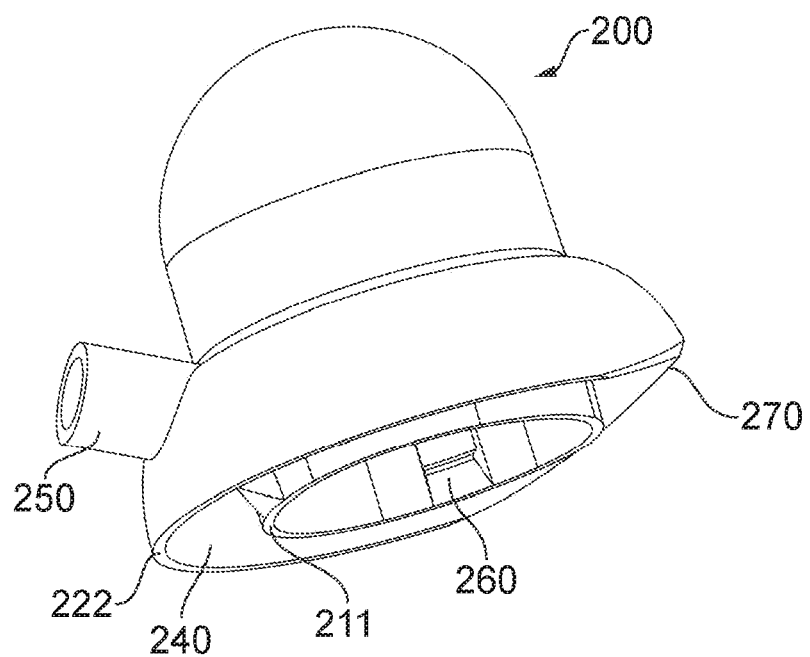
FIG. 10 shows a perspective view of the cap of FIG. 3.

As shown in FIG. 7, the annular base 210 of the cap body 210 has a tri-lobed shape in cross-section prior to assembly onto the fastener end 121 (the size of the lobes may differ). The number of lobes may vary, and so the annular base 210 of the cap body 210 may have a dual-lobed or other multi-lobed shape.

The tri-lobed cross-sectional shape extends from the base rim 211 of the annular base 210 to a location substantially in line with (or in the vicinity of) the junction between the skirt 220 and the annular base 210. The cross-sectional shape of the cap body 201 between this location and the upper domed part 202 changes to provide a continuous blending from the tri-lobed shape to a substantially circular shape. The annular base 210 has the three protrusions 261 which extend radially inwardly from three evenly spaced positions around the annular base 210. The guide elements 260 provide the cam surface 262 to contact the fastener 120, and the tri-lobed shape is such that a radially outwardly extending lobe 265 extends between each neighbouring pair of protrusions 261. Although there are three guide elements 260, and three lobes 265, in this embodiment, the invention extends to embodiments with more than three guide elements 260 and lobes, and especially to embodiments with four, five, six or seven guide elements and lobes.

Where various features are described as being annular, these parts may have a circular cross-section. However, in the case of a non-circular cap assembly then these annular features will have a non-circular cross-sectional shape. The term "annular" is used herein to refer to a feature (for instance a rim, shoulder, protrusion or recess) which runs round a circumference of the cap assembly regardless of the shape of that circumference.

The lobed shape of the base 210 enables the base 210 to deform so that it has a substantially cylindrical shape as a result of its installation on the fastener end 121. The base 210 is installed on the fastener end 121 so that the locating face 262 of each guide element 260 contact the step 125 of the fastener 120. As shown in the figures, the locating face 262 contacts an edge of the step 125. However, it will be understood that the step may be angled relative to the longitudinal axis of the fastener 120 so that the locating face 162 of each guide element 260 locates against a face of the step 125.

Prior to installation (FIG. 7), the circumference of the washer 124 forming the step 125, defining a contact region, is located radially further outwardly than the free end 263 of each guide element 260. Therefore, the protrusions 261 must be urged radially outwardly to achieve installation. The base 210 is deformable such that the protrusions 261 are displaceable radially away from the cap axis 230. Upon displacement, the protrusions 261 are biased radially towards the cap axis 230. The guide elements 260 therefore distend radially outwardly. Upon insertion of the fastener 120 into the cap 200, the open face 264 contacts the fastener 120 and urges the guide elements 260 to distend outwardly. The angle of the open face 264 relative to the cap axis 230 causes an outward bias, and the base 210 deforms. The guide elements 260 at their free end 263 slide along the fastener 120, until the step 125 is reached.

As a result of the outward distention of the guide elements 260, the base 210 deforms so that the lobes become shallower, i.e. less curved, to the extent that the base 210 becomes substantially cylindrical, that is less lobed. This change in shape provides a radially inward bias between the guide elements 260 and the fastener 120. When the guide elements 260 overlap the step 250, the inward bias of the deformed base 210 causes the guide elements 260 to distend inwardly. The cam surface of the guide elements 260 is urged to slide along the edge of the step 125. As a result of the incline of the cam surfaces relative to the base rim plane 214, the radially inward distention provides a longitudinal bias to the cap 200 along the cap axis 230. That is, the cap 200 is biased to move in an inboard direction along the cap axis 230, that is towards the surface 111 of the structure 110. The cap 200 is therefore urged into a positive abutment with the structure 110. The base rim 211 is biased into a positive engagement with the surface 111. By providing a linear bias against the surface 111 of the structure 111, leakage between the base 210 and the surface 111 is further restricted or prevented. The downward bias acts against an upward force applied on the cap 200 during injection and curing of sealant material into the annular pocket 240.

It will be understood that in the embodiment described herein, the expected deformation of the base 210 when the dimensions of the fastener 120 are at their nominal dimensions. For example, if the height of the step 125 is greater than the nominal dimension, or the diameter of the washer 124 is smaller than the nominal dimension (e.g. because of manufacturing tolerances) then the base 210 may remain lobe shaped after installation, but with shallower lobes than before installation. On the other hand, if the height of the step 125 is smaller than the nominal dimension, or the diameter of the washer 124 is greater than the nominal dimension then the base 210 may adopt an inverse lobed shape, in which the maximum extent of each lobe coincides with the protrusions 261 (that is, the lobes are formed at the protrusions 261 rather than between them). In each of these cases the deformation provides a radial biasing action on the guide elements 260.

The protrusions 261 are integrally formed with the base 210. That is, the protrusions 261 are in a fixed relationship with the annular base 210. In the presently described embodiments, the inwardly radial bias on the protrusions 261 is provided by the lobed arrangement of the base, alternative configurations are possible. For example, alternatively or additionally the protrusions are pivotally mounted and/or the protrusions themselves are resilient.

One of the guide elements 260 is disposed adjacent to the inlet hole 251. By providing the inlet hole 251 with the adjacent guide element 260 it is possible to help restrict movement of the cap 200 away from the structure surface 111.

All parts of the cap are integrally formed by injection moulding or similar. A suitable material is a nylon material, such as Nylon PA66 or Nylon PA12.

A suitable sealant material is a polythioether sealant such as PPG PR-2001B2 or a polysulphide sealant such as Naftoseal® MC238B, MC238A, or MC780 available from Chemetall Group.

During forming of joint 100, the cap is retained on the fastener 120 and the base rim 211 is urged into engagement with the surface 111. Sealing material is injected into the pocket 240. The sealing material flows from the inlet hole 251 into the pocket 240. When the pocket 240 is full, the pressure in the pocket 240 increases until it forces sealing material to escape the pocket 240 through the skirt 220 via the outlet 270. When the flow of sealing material out of the outlet 270 is visually observed, the flow of sealing material into the inlet hole 251 is stopped. Alternatively, or additionally, the outlet includes an outlet hole formed through the skirt 220. As the pressure is applied by the sealing material, the cap 200 is urged upwardly. The biasing of the protrusions 261 against the step 125 causes a counteraction to the pressure applied by the sealing material to maintain the intimate engagement of the base rim 211 against the surface and prevent any gap being formed between the base 210 and the surface 111. As such, leakage into the inner cavity 130 is prevented.

The sealing material is then allowed to cure, leaving a cured sealing material 140 (shown in FIG. 3) in the pocket 240 which secures the cap 200 to the structure 110 and forms a seal around the cavity 130. This seal prevents the ingress of water or other contaminants into the cavity 130, and also prevents plasma or other out-gassing products from exiting the cavity 130 in the event of a lightning strike. Cured sealing material 140 also fills the injection channel, the inlet hole 251 and the outlet 270.

As described above, the base rim 211 lies in the plane 214. The base rim 211 lying in the base rim plane 214 helps to ensure that the base rim 211 is able to intimately engage with the planar surface 111 of the structure 110 around its full circumference when the cap 200 is fitted over the end 121 of the fastener 120 and the biasing configuration of the cap 200 acts on the fastener 120 to positively bias the base rim 211 against the surface 111 of the structure 110.

The skirt rim 222 lies in a plane 225. The skirt rim plane 225 is not coplanar with the base rim plane 214. The skirt rim 222 of the skirt 220 is spaced from the base rim plane around its full circumference. As such, there is an offset from the base rim plane 214. The offset defines a gap between the skirt rim 222 and the base rim plane 214.

When the outlet recess 271 forms the recess 270 in the skirt 220, the length of the skirt 220 is uniform around the circumference of the skirt 220 except for the recess 271. The skirt rim 222 lies in the skirt rim plane 225 around the full circumference of the skirt 220, except for the recess 271. The skirt rim plane 222 lies parallel to the base rim plane 214.

Figure 4:
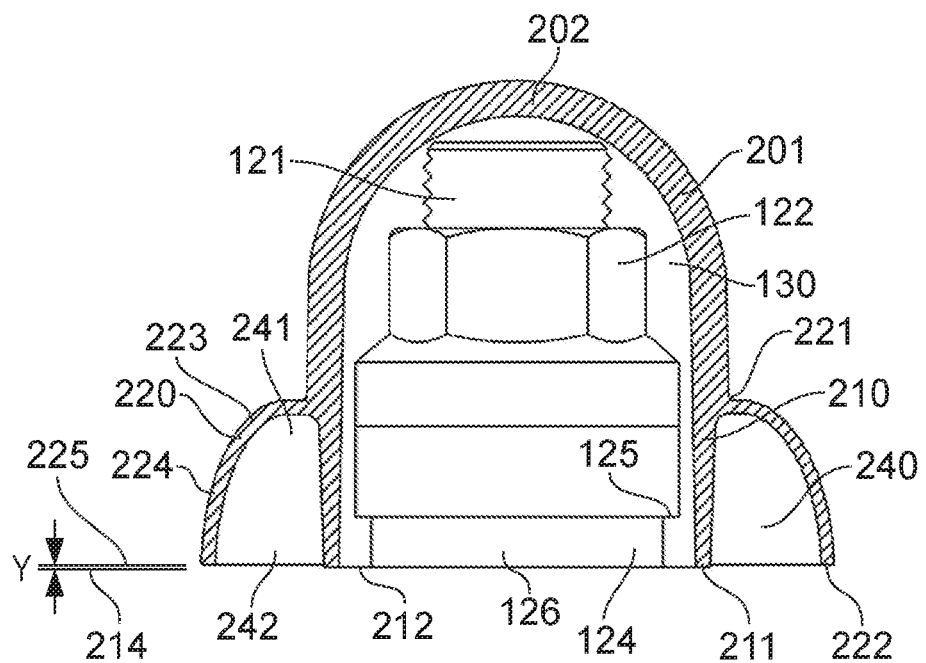
FIG. 4 shows a partial cross-sectional side view of the joint of FIG. 3 comprising the fastener and the cap prior to injection with a sealant.
Figure 5:
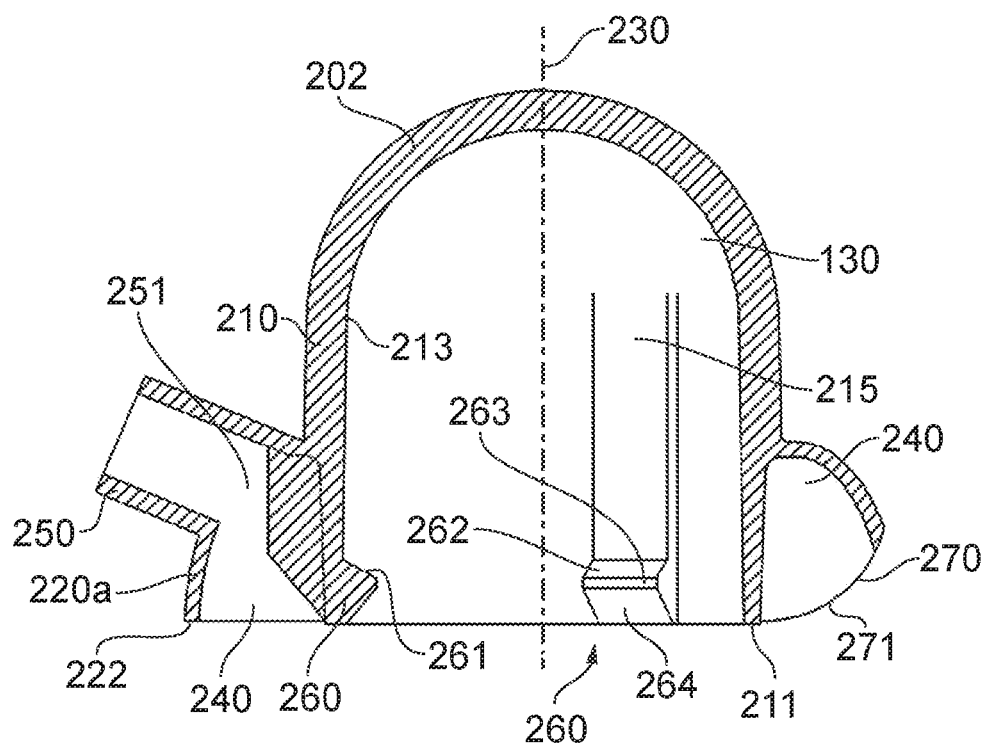
FIG. 5 shows a cross-sectional front view of the cap of FIGS. 3 and 4.
Figure 6:
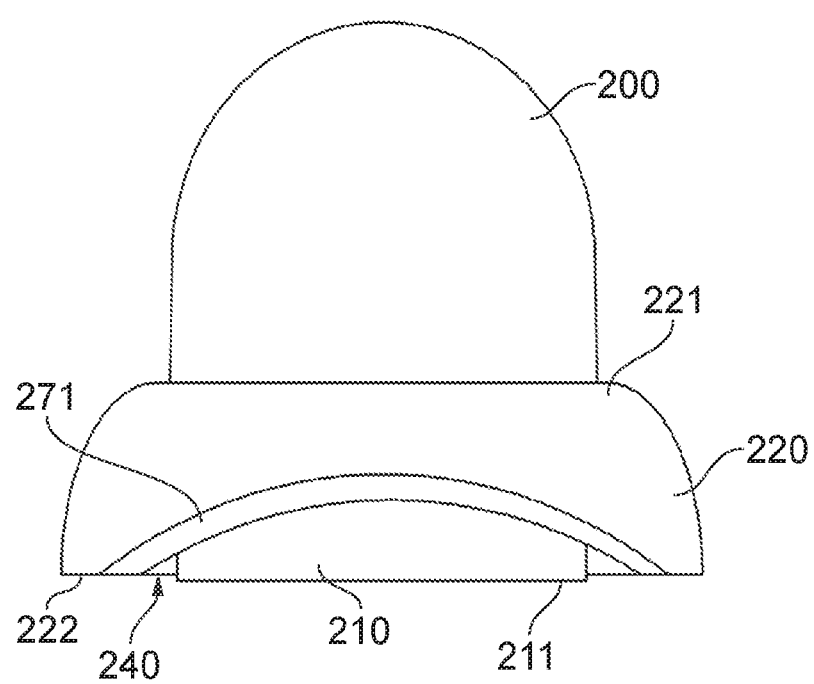
FIG. 6 shows a side view of the cap of FIGS. 3-5.

The offset, represented by dimension Y in FIG. 4, of the skirt rim 222 from the base rim plane 214 around at least the majority of the circumference of the skirt 220 is in the range of 0.05 mm and 0.35 mm. It will be understood that the offset may be determined based on the viscosity of the sealant material to be used with the cap 200.

When the cap 200 is fitted over the end 121 of the fastener 120, the rim 211 lies in its plane so it can intimately engage with the planar surface 111 of the structure 110 around its full circumference. This helps prevent leakage of air and sealant into the inner cavity 130. The offset Y of the skirt rim 122 from the plane of the base rim 211 helps to ensure that the skirt 120 does not come into contact with the planar surface 111 of the structure 110.

Although a positive offset is provided between the skirt rim and the base rim plane in the above described embodiments, it will be understood that the cap may be formed with no offset. In such an arrangement, the skirt rim lies on the base rim plane. In such an embodiment, at least of the skirt and the skirt rim may be formed from a flexible material. In a similar arrangement, the skirt and the skirt rim formed from a flexible material extends through the base rim plane.

Although in the above described embodiments the cap is formed from a one-piece cap member, it will be understood that alternative configurations are possible. For example, in an alternative embodiment, the cap is formed from a two-piece cap member in which the annular pocket is defined between an inner cap member forming the annular base and an outer cap member forming the skirt rim. In such an arrangement, the form and function are generally similar, with the arrangement of the biasing configuration being applicable to such an embodiment.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A cap for forming a sealed cavity around an end of a fastener protruding from a surface of a structure, the cap comprising:
a cap body with an annular base terminating at a base rim which surrounds an opening into a central cavity for receiving the end of the fastener and lies in a base rim plane around at least a majority of a circumference of the annular base;
an annular skirt providing an annular pocket for receiving a sealant material between the skirt and the annular base, and
a biasing configuration configured to positively bias the base rim against the surface of the structure,
wherein the biasing configuration comprises at least one protrusion extending inwardly from the base into the central cavity, and
wherein the at least one protrusion comprises a cam surface arranged to locate against the fastener, the cam surface being inclined to slope towards the base rim plane away from the base to a free end of the at least one protrusion.

2. The cap of claim 1, wherein the cap body comprises a cap axis, the biasing configuration being displaceable radially away from the cap axis and being biased radially towards the cap axis upon displacement.

3. The cap of claim 2, wherein the annular base acts on the biasing configuration to bias the biasing configuration radially inwardly.

4. The cap of claim 1, wherein the at least one protrusion comprises at least two, and optionally at least three, opposing protrusions distributed around the base.

5. The cap of claim 4, wherein the at least two opposing protrusions are distributed around an internal face of the annular base, wherein the annular base has a lobed shape in cross-section such that a radially outwardly bulging lobe extends between each neighbouring pair of protrusions.

6. The cap of claim 1, wherein the at least one protrusion comprises a guide element forming the cam surface.

7. The cap of claim 6, wherein the at least one protrusion comprises a rib projecting inwardly from the annular base, and the guide element projects from the rib.

8. The cap of claim 1, wherein the cam surface is inclined at between 15-60 degrees to the base rim plane.

9. The cap of claim 1, wherein the at least one protrusion is in a fixed relationship with the annular base.

10. The cap of claim 1, wherein the at least one protrusion is proximate to or at the base rim.

11. The cap of claim 1, wherein the at least one protrusion comprises an open face configured to abut the fastener as the cap is received over the end of the fastener to urge the at least one protrusion to distend radially outwardly.

12. The cap of claim 1, comprising an inlet hole in the skirt, wherein the inlet hole is in fluid communication with the pocket to permit a flow of sealing material through the skirt via the inlet hole into the pocket; and an outlet in the skirt, wherein the outlet is in fluid communication with the pocket and arranged to enable air to escape the annular pocket through the skirt via the outlet as the sealing material flows from the inlet hole into the pocket.

13. The cap of claim 1, wherein the base rim lies in the base rim plane around the full circumference of the skirt.

14. A spark prevention cap for forming a sealed cavity around an end of a fastener, the cap comprising:
a cap body with an annular base terminating at a base rim which surrounds an opening into a central cavity for receiving the end of the fastener and lies in a base rim plane around at least a majority of a circumference of the annular base;
at least two guide elements distributed around an internal face of the annular base, each guide element extending inwardly into the central cavity from the annular base;
wherein the annular base has a lobed shape in cross-section such that a radially outwardly bulging lobe extends between each neighbouring pair of guide elements, and
wherein each guide element comprises a cam surface, the cam surface being inclined to slope towards the base rim plane away from the annual base to a free end of each guide element.

15. The cap of claim 14, wherein each guide element is a retention tab.

16. The cap of claim 15, comprising an annular skirt providing an annular pocket for receiving a sealant material between the skirt and the annular base.

17. A joint comprising:
a structure;
an end of a fastener protruding from the structure; and
a cap for forming a sealed cavity around an end of a fastener protruding from a surface of a structure, the cap comprising:
a cap body with an annular base terminating at a base rim which surrounds an opening into a central cavity for receiving the end of the fastener and lies in a base rim plane around at least a majority of a circumference of the annular base;
an annular skirt providing an annular pocket for receiving a sealant material between the skirt and the annular base, and
a biasing configuration configured to positively bias the base rim against the surface of the structure;
wherein the biasing configuration comprises at least one protrusion extending inwardly from the base into the central cavity, and
wherein the at least one protrusion comprises a cam surface arranged to locate against the fastener, the cam surface being inclined to slope towards the base rim plane away from the base to a free end of the at least one protrusion;
the cap forming a sealed cavity around the end of the fastener, the cap comprising a cured sealing material in the annular pocket which secures the cap to the structure.

18. A method of assembling the joint of claim 17, the method comprising: fitting the cap over the end of the fastener; and injecting sealing material into the annular pocket, wherein the cam surface provides a biasing force to aid positive engagement of the base rim with the surface prior to the sealing material being injected.

* * * * *